UNITED STATES PATENT OFFICE.

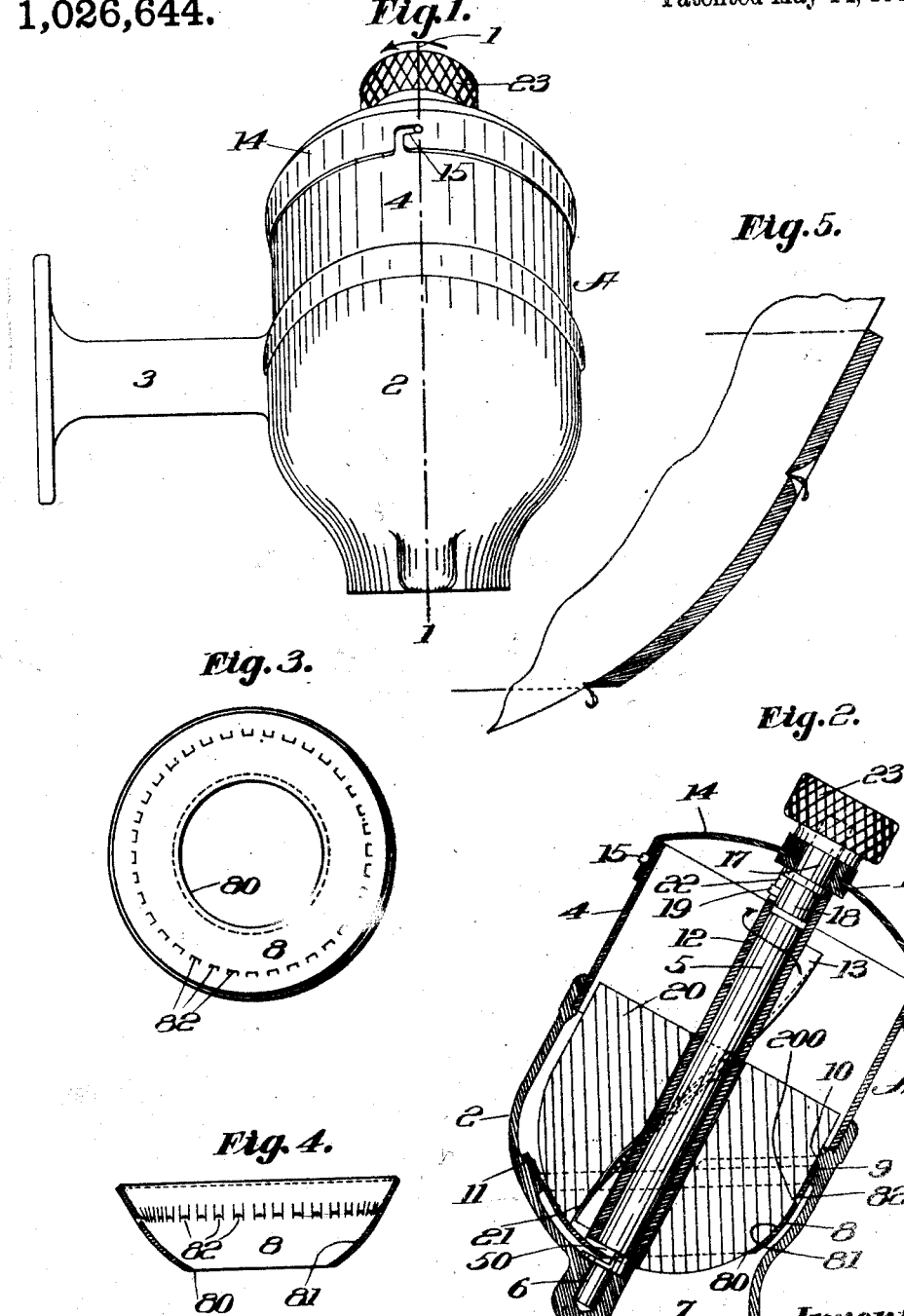

WILLIAM HADDOW, OF OSSINING, NEW YORK.

SOAP-DISPENSING MACHINE.

1,026,644.  Specification of Letters Patent.  Patented May 14, 1912.

Application filed August 17, 1910. Serial No. 577,688.

*To all whom it may concern:*

Be it known that I, WILLIAM HADDOW, a citizen of the United States, and a resident of Ossining, in the county of Westchester and State of New York, have invented certain new and useful Improvements in Soap-Dispensing Machines, of which the following is a specification.

This invention relates to soap dispensing machines and particularly to that class thereof as include cutting means, rotatable or fixed, in combination with means for rotating the material to be ground, scraped or abraded.

My improvements are directed particularly to devices of the class specified which are provided for dispensing in a finely divided state such material as can be obtained in or conveniently molded into cakes as soap, stove polish and the like.

The object of my improvements is to provide a device of the class specified of simple construction and efficient in operation.

In the drawing accompanying this specification is illustrated the preferred embodiment of my improvements. Therein Figure 1 is an elevation of my improved machine. Fig. 2 is a vertical cross-section on line 1—1 of Fig. 1. Fig. 3 is a plan and Fig. 4 a sectional elevation of the cutter of my improved device. Fig. 5 is a detail sectional elevation to an enlarged scale, illustrating the operation of the cutter upon the cake of material.

My improved device comprises a receptacle A preferably cylindrical in form and for convenience of manufacture divided into two portions, as body 2, preferably having means thereon as bracket 3 for supporting said device from some convenient wall or otherwise, and neck 4 fixed in said body 2. Stem 5 is mounted in a suitable step 6 in the lower end of body 2 and preferably co-axial with said receptacle A. In the bottom of body 2 and preferably at one side of step 6 is discharge opening 7. In the lower portion of body 2 and with its axis at an angle to the axis of receptacle A cutter 8 is rotatably mounted in seat 9 provided therefor in said body 2. Throughout a portion, preferably about one third, of its circumference, said seat 9 has overhanging flange 10 which in coöperation with lug 11 opposite thereto serves to retain said cutter 8 in operative position on its seat 9, while permitting free rotation of said cutter. Said cutter 8 may be made of sheet metal and is preferably approximately a spherical zone in shape. Stem 5 is provided with a notch or mortise 50 near its lower end for the passage of edge 80 of cutter 8 and which edge is approximately tangent to the axis of stem 5, so as to cut to the center of the cake of material 20 as said cake is rotated about said stem 5 as an axis. Turning freely on said stem 5 is sleeve 12; said sleeve is provided with a lengthwise rib 13 preferably arranged helically thereon. Said rib is provided for engagement with a corresponding slot or groove 21 in the cake of material as a means for rotating said material from said sleeve. The helical disposition of said rib 13 and groove 21 are efficient for urging said cake of material 20 downwardly onto cutter 8 when sleeve 12 is turned in the direction of its arrow.

Receptacle A may be provided with a cover 14 and which cover may be locked onto said receptacle by an ordinary bayonet lock 15 or by other suitable means. Suitably secured to said cover 14 and concentric with stem 5 is bearing 16 in which is revolubly mounted driver 17 for sleeve 12. Said driver comprises stem 18 extending into the upper end of sleeve 12 and having pin 19 in engagement with slot 22 of said sleeve 12. A convenient knurled button 23 may be fixed to the upper end of said driver 17. This particular arrangement of driver is not essential to my improvements but has been found convenient. It will be obvious to one skilled in the art that other well known means for communicating rotary motion to sleeve 12 will be equally efficient.

Referring again to dish shaped cutter 8 it will be obvious that cutting edge 80 of said cutter cannot cut an area on said cake of material 20 of a greater diameter than twice the diameter of said edge 80; and while said edge 80 might have a greater diameter relative to the diameter of cake 20 any material increase in the diameter of edge 80 would so reduce the area of cup shaped wall 81 of cutter 8 as to provide inadequate support for said cake and cause edge 80 to make too deep and wasteful a cut in said cake 20. I therefore prefer to make the diameter of edge 80 relatively small and to supplement its work by means of a circular row of teeth 82. Said teeth are conveniently formed by punching inwardly small portions of the wall of cutter 8. Said row of teeth 82, is disposed at a sufficient distance upwardly from cutting edge 8 to operate upon the full diameter of cake 20 at 200, Fig. 2.

In operation, the rotation of cake 20 in engagement with teeth 82 will cause cutter 8 to rotate in the same direction as said cake. Or if desired cutter 8 may be secured against rotation by causing lug 11 to securely engage the edge of said cutter. In this latter case the material cut from said cake 20 will be somewhat greater in volume than in the former case where cutter 8 is rotated.

I thus produce a dispensing device for soap and the like of greater simplicity and efficiency and having small liability to derangement.

I claim:—

1. A soap dispensing machine including in combination, a receptacle, a stem supported therein, means for rotating a cake of material supported on said stem and a dish shaped cutter supported in said receptacle and having its axis at an angle to the axis of said stem.

2. A soap dispensing machine including in combination, a receptacle, a stem supported therein, means on said stem for simultaneously rotating and urging cutterward a cake of material supported on said stem and a cutter supported in said receptacle and having its axis at an angle to the axis of said stem.

3. A soap dispensing machine including in combination, a receptacle, a stem supported therein, means for rotating a cake of material supported on said stem, a cutter of approximately hollow spherical zone shape supported in said receptacle and having its axis at an angle to the axis of said stem and having cutting means at its lower edge and between its lower and upper edges.

4. A soap dispensing machine including in combination, a receptacle, a stem supported therein, means on said stem for simultaneously rotating and urging cutterward a cake of material supported on said stem, a cutter of approximately hollow spherical zone shape supported in said receptacle and having its axis at an angle to the axis of said stem and its lower circular edge comprising cutting means and having a plurality of teeth projecting inwardly from its inner surface.

5. A soap dispensing machine including in combination, a receptacle, a stem supported therein, a sleeve rotatably mounted on said stem, driving means on the sleeve, means for rotating the sleeve and a cutter of approximately hollow spherical zone shape supported in said receptacle and having its axis at an angle to the axis of said stem.

6. A soap dispensing machine including in combination, a cylindrical receptacle, an axial stem supported therein, a sleeve rotatably mounted on said stem, a helical rib on the sleeve, a cover for one end of said receptacle, means for rotating the sleeve and for supporting the upper end thereof, carried by said cover, a dish shaped cutter rotatably supported in said receptacle and having its axis at an angle to the axis of the receptacle and having cutting means at its lower edge and between its lower and upper edges.

7. A soap dispensing machine including in combination, a cylindrical receptacle, an axial stem supported therein, a sleeve rotatably mounted on said stem, a helical rib on the sleeve, means for rotating the sleeve and a cutter rotatably supported in said receptacle and having its axis at an angle to the axis of the receptacle.

Signed this 15th day of August 1910 in the Park Row Building New York before two subscribing witnesses.

WILLIAM HADDOW.

Witnesses:
 WILBUR M. STONE,
 CHAS. W. LA RUE.